United States Patent
Segall

(10) Patent No.: US 9,749,657 B2
(45) Date of Patent: Aug. 29, 2017

(54) BUFFER COMPRESSION FOR MOTION VECTOR COMPETITION

(75) Inventor: Christopher A. Segall, Camas, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 1417 days.

(21) Appl. No.: 13/101,451

(22) Filed: May 5, 2011

(65) Prior Publication Data

US 2012/0189059 A1 Jul. 26, 2012

Related U.S. Application Data

(60) Provisional application No. 61/435,243, filed on Jan. 21, 2011.

(51) Int. Cl.
*H04N 7/26* (2006.01)
*H04N 19/61* (2014.01)
*H04N 19/513* (2014.01)

(52) U.S. Cl.
CPC ........... *H04N 19/61* (2014.11); *H04N 19/513* (2014.11)

(58) Field of Classification Search
None
See application file for complete search history.

(56) References Cited

U.S. PATENT DOCUMENTS 8,175,160 B1 * 5/2012 Arici et al. .............. 375/240.16
8,432,970 B1 * 4/2013 Cahalan ................ H04N 19/56
375/240.16

2003/0016751 A1 * 1/2003 Vetro et al. .............. 375/240.16
2004/0223548 A1 * 11/2004 Kato ................ H04N 19/00696
375/240.16

(Continued)

FOREIGN PATENT DOCUMENTS

WO 2011152315 A1 12/2011

OTHER PUBLICATIONS

Frank Bossen et al., "Simplified motion vector coding method," Joint Collaborative Team on Video Coding (JCT-VC) of ITU-T SG16 WP3 and ISO/IEC JTC1/SC29/WG11 $2^{nd}$ Meeting: Geneva, CH, Jul. 21-28, 2010, [JCTVC-B094].*

(Continued)

*Primary Examiner* — Joseph Ustaris
*Assistant Examiner* — Edemio Navas, Jr.
(74) *Attorney, Agent, or Firm* — Greer Burns & Crain, Ltd.

(57) ABSTRACT

Deriving a motion vector of a current block, in a current frame, including: generating a motion vector predictor candidate list including a set of first motion vectors and a second motion vector, wherein a first motion vector of the set belongs to a block adjacent to the current block in the current frame, and the second motion vector is a temporal motion vector of a pixel at a modified position (x', y') in a previous frame, the modified position (x', y') being derived by modifying a top-left position (x, y) of the current block. The method also includes deriving the modified position (x', y') using arithmetic shift operations; setting the second motion vector equal to a motion vector at the modified position (x', y') of the pixel in the previous frame; and deriving the motion vector of the current block using a motion vector predictor and a difference motion vector.

5 Claims, 6 Drawing Sheets

(56) References Cited

U.S. PATENT DOCUMENTS

| | | | | |
|---|---|---|---|---|
| 2004/0240550 | A1* | 12/2004 | Suzuki | H04N 19/56 375/240.16 |
| 2005/0036552 | A1* | 2/2005 | Takahashi et al. | 375/240.16 |
| 2005/0041740 | A1* | 2/2005 | Sekiguchi et al. | 375/240.16 |
| 2008/0049845 | A1* | 2/2008 | Liu | 375/240.27 |
| 2009/0168890 | A1* | 7/2009 | Holcomb | 375/240.16 |
| 2010/0283892 | A1* | 11/2010 | Zhou et al. | 348/441 |
| 2011/0122950 | A1* | 5/2011 | Ji et al. | 375/240.16 |
| 2011/0211640 | A1* | 9/2011 | Kim et al. | 375/240.16 |
| 2011/0261882 | A1* | 10/2011 | Zheng et al. | 375/240.13 |

OTHER PUBLICATIONS

Tourapis et al., "Fast ME in the JM reference software," Joint Video Team (JVT) of ISO/IEC MPEG & ITU-T VCEG (ISO/IEC JTC1/SC29/WG11 and ITU-T SG16 Q.6, Jul. 24-29, 2005, JVT-P026.*

International Search Report, mailed May 1, 2012, PCT International App. No. PCT/JP2012/051736, Sharp Kabushiki Kaisha, 5 pgs.

Bossen et al., "Simplified motion vector coding method," Joint Collaborative Team on Video Coding (JCT-VC) of ITU-T SG16 WP3 and ISO/IEC JTC1/SC29/WG11 2nd Meeting: Geneva, CH, Jul. 21-28, 2010, 5 pgs.

Su et al., "On motion vector competition," Joint Collaborative Team on Video Coding (JCT-VC) of ITU-T SG16 WP3 and ISO/IEC JTC1/SC29/WG11 3rd Meeting: Guangzhou, CN, Oct. 7-15, 2010, 2 pgs.

Sato, "On Motion Vector Coding," Joint Collaborative Team on Video Coding (JCT-VC) of ITU-T SG16 WP3 and ISO/IEC JTC1/SC29/WG11 2nd Meeting: Geneva, CH, Jul. 21-28, 2010, 9 pgs.

Jung et al., "Temporal MV predictor modification for MV-Comp, Skip, Direct and Merge schemes," Joint Collaborative Team on Video Coding (JCT-VC) of ITU-T SG16 WP3 and ISO/IEC JTC1/SC29/WG11 4th Meeting: Daegu, KR, Jan. 20-28, 2011, 5 pgs.

Search Report issued by the European Patent Office for corresponding EP Application No. EP 12 73 6264, mailed Feb. 16, 2015.

Tourapis A M et al: "Fast ME in the JM reference software", Joint Video Team (JVT) of ISO/IEC MPEG & ETU-T VCEG (ISO/IEC JTC1/SC29/WG11 and ITU-T SG16 Q.6) 16th Meeting: Poznan, PL, Jul. 24-29, 2005.

Fujibayashi (NTT DoCoMo) A et al: "CE9 3.2d Simplified Motion vector prediction", Joint Collaborative Team on Video Coding (JCT-VC) of ITU-T SG16 WP3 and ISO/IEC JTC1/SC29/WG11 4th Meeting: Daegu, KR, Jan. 20-28, 2011.

Onno P: "CE9: Cross verification about the adaptation and modification (3.2.c) of the set of predictors", Joint Collaborative Team on Video Coding (JCT-VC) of ITU-T SG16 WP3 and ISO/IEC JTC1/SC29/WG11 4th Meeting: Daegu, KR, Jan. 20-28, 2011[JCTVC-D117].

* cited by examiner

BUFFER COMPRESSION FOR MOTION VECTOR COMPETITION

CROSS-REFERENCE TO RELATED APPLICATIONS

This application claims the benefit of U.S. Provisional App. No. 61/435,243, filed Jan. 21, 2011.

BACKGROUND OF THE INVENTION

The present invention relates to image decoding using buffer compression for motion vector competition.

Existing video coding standards, such as H.264/AVC, generally provide relatively high coding efficiency at the expense of increased computational complexity. As the computational complexity increases, the encoding and/or decoding speeds tend to decrease. Also, the desire for increasingly accurate motion estimation tends to require increasingly larger memory requirements. The increasing memory requirements tend to result in increasingly more expensive and computationally complex circuitry, especially in the case of embedded systems.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
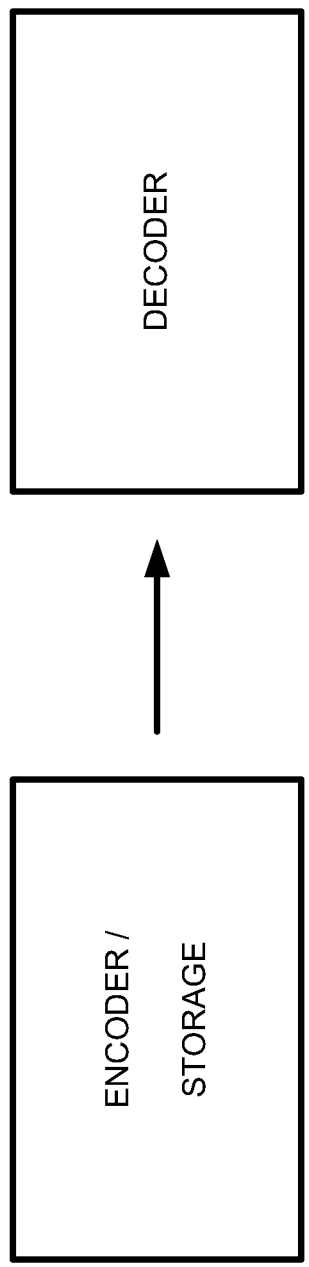
FIG. 1 illustrates an encoder and decoder.

Referring to FIG. 1, a video system typically includes a video source such as an encoder or storage for encoded video, and a decoder. In the video decoder, one of the aspects that facilitates higher compression performance for high resolution video is larger block structures with flexible mechanisms of sub-partitioning. For example, the TMuC (JCT-VC, "Test Model under Consideration", document JCTVC-A205 of JCT-VC, (2010), incorporated by reference herein) defines coding units (CUs) which define sub-partitioning of an image into rectangular regions. The coding unit contains one or more prediction units (PUs) and transform units (TUs). The partition geometry of these elements may be encoded using a tree segmentation structure. At the level of the PU, either intra-picture or inter-picture prediction may be selected. Intra-picture prediction may be performed from samples of already decoded adjacent PUs, where the different modes may include (1) DC (flat average), (2) horizontal, (3) vertical, (4) one of up to 28 angular directions (number depending on block size), (5) plane (amplitude surface) prediction, and (6) bilinear prediction. The signaling of the mode is derived from the modes of adjacent PUs. Inter-picture prediction is performed from regions(s) of already decoded pictures stored in the reference picture buffer. This permits selection among multiple reference pictures, as well as bi-prediction (including weighted averaging) from two reference pictures or two positions in the same reference picture. The reference area is selected by specifying a motion vector displacement and a reference picture index, which may generally be referred to herein as a motion vector. For efficient encoding, derivation of motion vectors from those of adjacent PUs may be made by a median computation or as motion vector competition. The motion vector difference between the predicted motion vectors and the actual motion vectors may also be transmitted. Motion compensation may be performed with a motion vector precision up to quarter-sample or one-eights sample precision.

Figure 2:
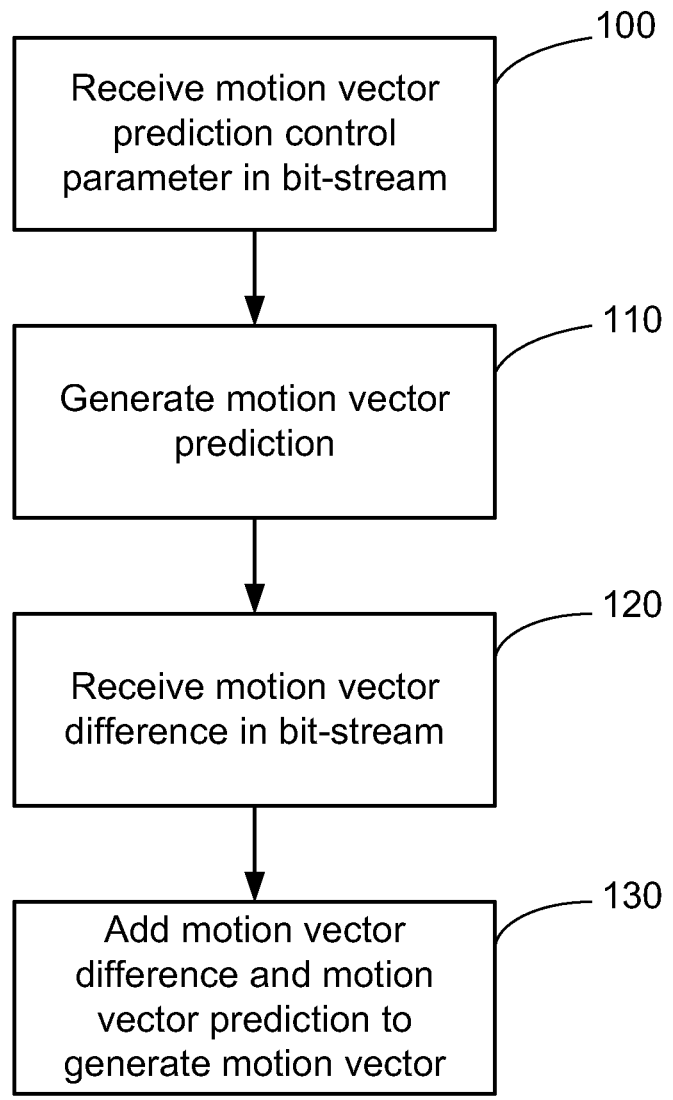
FIG. 2 illustrates a vector decoding process.

Referring to FIG. 2, motion estimation for the current image uses a motion vector coding process that generally includes receiving a motion vector prediction control parameter in the bit stream 100. The motion vector prediction control parameter may be an index value used to select from among a group of available motion vectors. A motion vector prediction 110 may be generated based upon the motion vector prediction control parameter 100. The decoder may also receive a motion vector difference 120 in the bit stream. The motion vector difference 120 and the predicted motion vector 110 are used to generate a motion vector for the current image 130. In general, the bit stream provided to the decoder includes, among other data, a control parameter for the motion vector, and the difference between the prediction generated by the motion vector competition tool and the desired motion vector.

Figure 3:
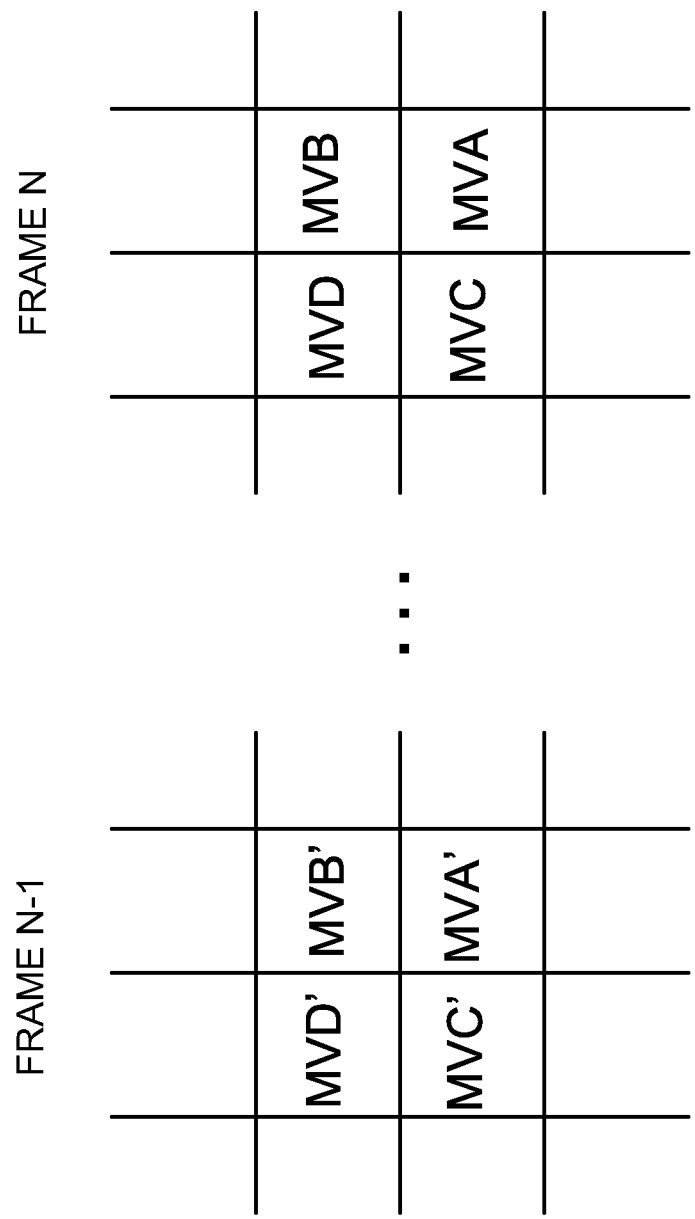
FIG. 3 illustrates a partial pair of two frames.

Referring to FIG. 3, for the motion vector competition process a list of candidate motion vectors may be created. In general, the potential motion vectors, may include for example, a motion vector MVB from above the current block A, a motion vector MVC to the left of the current block A, and a motion vector MVD to the above left of the current block A. The potential motion vectors may, for example, include one or more of all of the adjacent blocks. The list of candidate motion vectors may also include one or more motion vectors from one or more previously encoded frames. For example, one of the previous motion vectors may be the co-located block A' of the previous frame with the current block A. It is noted that often the video coding and decoding is not performed in the same temporal order in which it is displayed.

Figure 4:
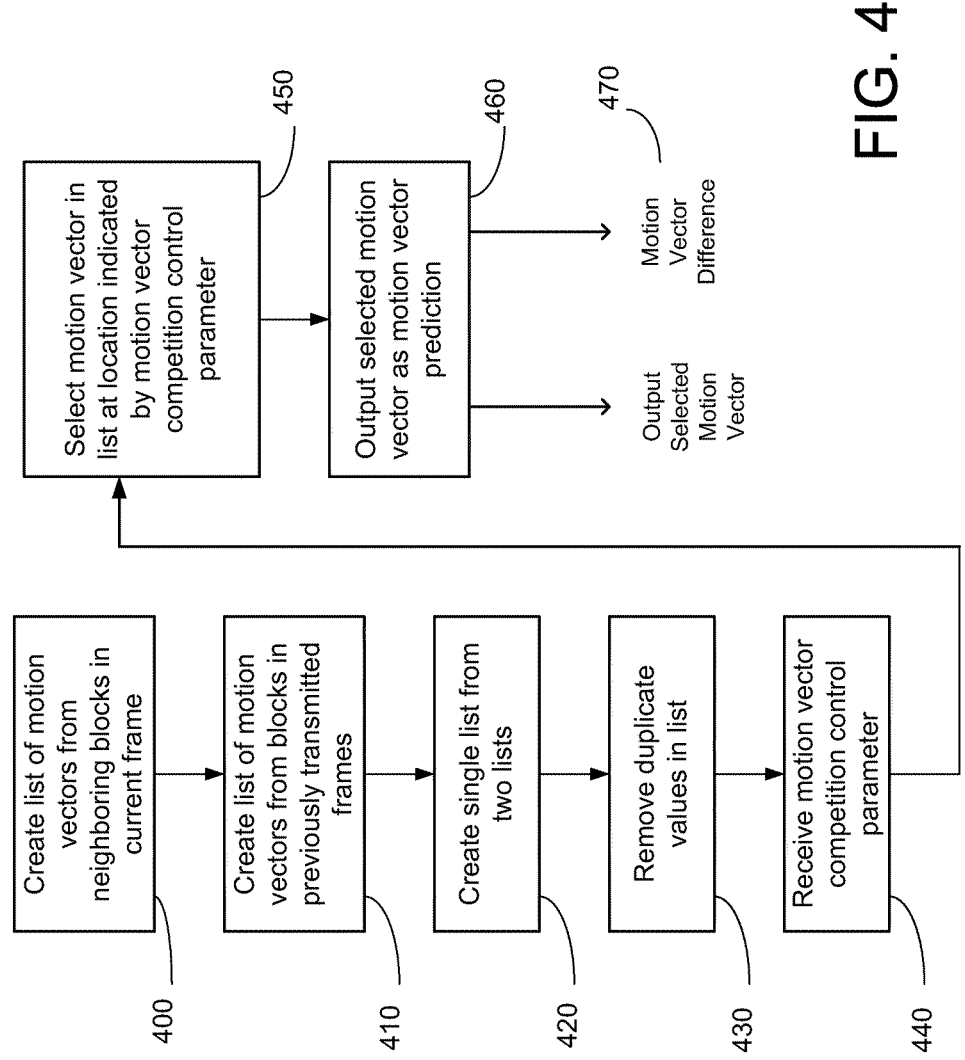
FIG. 4 illustrates a motion vector competition process.

Referring to FIG. 4, a particular implementation of a motion vector competition process utilizes a list of motion vector(s) of neighboring block(s) in the current frame 400 and a list of motion vector(s) from previous block(s) in a previously transmitted frame 410. The two lists of motion vectors 400, 410 are merged 420 to create a single list. Duplicate values in the list are removed 430. The motion vector competition control parameter 440 is received, which is typically an index. The motion vector competition control parameter, or equivalently the motion vector control parameter, 440 is used to select 450 an appropriate motion vector in the list 430 at the location indicated. The selected motion vector 450 is provided as the output selected motion vector 460. The motion vector difference 470 between the predicted motion vector and the actual motion vector may also be provided. Thus, in a block by block manner, the motion vector competition tool predicts the motion vector for the current block. In general, the motion vector or any data which may be used to determine the motion vector may be transmitted.

Figure 5:
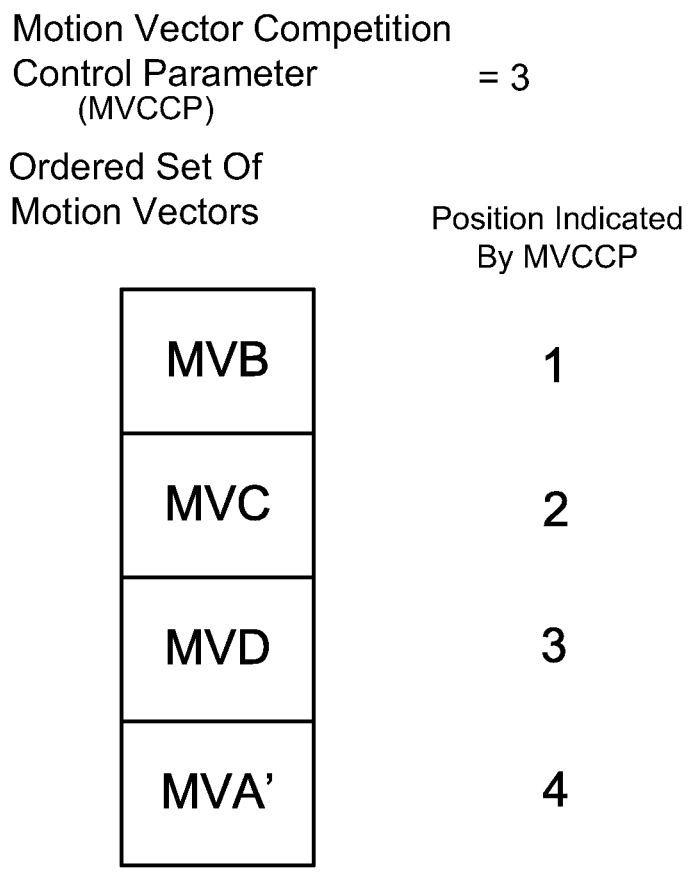
FIG. 5 illustrates a particular motion vector competition process.

As an illustrative example, referring to FIG. 5, a motion vector competition control parameter (MVCCP) is received in the bit stream, such as for example 3. The motion vector competition control parameter indicates where in the list of candidate motion vectors the desired motion vector is. If a set of motion vectors MVB, MVC, MVD, MVA' is created then the motion vector control parameter would indicates that the third motion vector MVD should be selected for the current block A as the motion vector prediction 460. For example, MVCCP 1 may be MVB, MVCCP 2 may be MVC, MVCCP 3 may be MVD, and MVCCP 4 may be MVA'.

In particular to creating the list of motion vectors from blocks in previously transmitted frames 410, several techniques have been previously used. For example, one such technique includes for a block in the current frame that spans the pixel locations (x,y) to (x+N, y+M), the motion vector from the previous frame used for the pixel prediction located at (x,y) is selected to be included in the list. For example, x,y may indicate the top-left position of the block, N may indicate the horizontal size of the block, and M may indicate the vertical size of the block. For example, another such technique includes for a block in the current frame that spans the pixel locations (x,y) to (x+N, y+M), the motion vector from the previous frame used for the pixel prediction located at (x+N/2, y+M/2) may be selected to be included in the list. While such techniques may select desirable motion vectors, the resulting list of motion vectors may tend to be large, resulting in significant memory requirements.

A modified technique for the current block in the current frame that spans the pixel locations (x,y) to (x+N, y+M) is to select and to store in the memory buffer the motion vector from the previous frame used for the pixel prediction located at ((x>>Z)<<Z, (y>>Z)<<Z) where Z is an integer. Preferably Z is 4. It is noted that (x>>Z)<<Z is generally equivalent to "the floor of (x/(2^Z))"*(2^Z). A floor function maps a real number to the largest previous integer value. For example, the floor(x)=[X] is the largest integer not greater than x. This technique is effective for a block size of 4×4 or, alternatively, 16×16.

Another modified technique for the current block in the current frame that spans pixels locations (x,y) to (x+N, y+M) is to select and to store in the memory buffer the motion vector from the previous frame used for the pixel prediction located at (((x>>Z)<<Z+Y, ((y>>Z)<<Z)+Y), where Y and Z are integers. Preferably Z is 4 and Y is 8. Also, Y may be 1<<(Z−1), which is generally equivalent to (2^Z)/2. It is noted that ((x>>Z)<<Z)+Y is generally equivalent to "the floor of (x/(2^Z))"*(2^Z)+Y. This technique is effective for a block size of 4×4 or, alternatively, 16×16.

Yet another modified technique for the current block in the current frame that spans pixel location (x,y) to (x+N, y+M) is to select and to store in the memory buffer the motion vector from the previous frame used for the pixel prediction located at ((((x+N/2)>>Z)<<Z)+Y, (((y+M/2)>>Z)<<Z)+Y), where Y and Z are integers. Preferably Z is 4 and Y is 8. Also, Y may be 1<<(Z−1) which is generally equivalent to (2^Z)/2. It is noted that (((x>>Z)<<Z)+Y is generally equivalent to "the floor (x/(2^Z))"*(2^Z)+Y. This technique is effective for a block size of 4×4 or, alternatively, 16×16.

A further modified technique for the current block in the current frame that spans pixel location (x,y) to (x+N, y+M) is to select and to store in the memory buffer the motion vector from the previous frame used for the pixel prediction located at ((((x+N/2)>>Z)<<Z)+Y, (((y+M/2)>>Z)<<Z)+Y), where Y and Z are integers. Preferably Z is 4 and Y is 4. Also, Y may be 1<<(Z−1) which is generally equivalent to (2^Z)/2. It is noted that (((x>>Z)<<Z)+Y is generally equivalent to "the floor (x/(2^Z))"*(2^Z)+Y. This technique is effective for a block size of 4×4 or, alternatively, 16×16.

In yet another modified technique for the current block in the current frame that spans pixel locations (x,y) to (x+N, y+M) is where the motion vector from the previous frame for the co-located block is coded by interpolation prediction, and the system may select among multiple motion vectors belonging to the co-located block. In this embodiment, a first motion vector for the current block is determined using a first motion vector in the previous frame used for the pixel prediction located at ((((x+N/2)>>Z)<<Z)+Y, (((y+M/2)>>Z)<<Z)+Y), where Y and Z are integers. Additionally, a second motion vector for the current block is determined using a second motion vector in the previous frame used for the pixel prediction located at ((((x+N/2)>>Z)<<Z)+Y, (((y+M/2)>>Z)<<Z)+Y), where Y and Z are integers. Preferably Z is 4 and Y is 4. Also, Y may be 1<<(Z−1) which is generally equivalent to (2^Z)/2. It is noted that (((x>>Z)<<Z)+Y is generally equivalent to "the floor (x/(2^Z))"*(2^Z)+Y. This technique is effective for a block size of 4×4 or, alternatively, 16×16.

Modified techniques may be used to select and to store in the memory buffer the motion vector from a previous frame which no longer requires the storage of every motion vector used in the prediction of previous frames. In a preferred embodiment, the motion vectors that are not used by the modified techniques are removed from memory after all steps required to decode the current frame are completed. In an alternative embodiment, the motion vectors that are not used by the modified techniques are removed from memory after being used for prediction but before all steps required to the decode the current frame are completed. In a specific example, the motion vectors that are not used by the modified techniques are removed from memory before a de-blocking operation is performed, and the de-blocking operation uses only the motion vectors that are not used by the modified techniques for processing.

Figure 6:
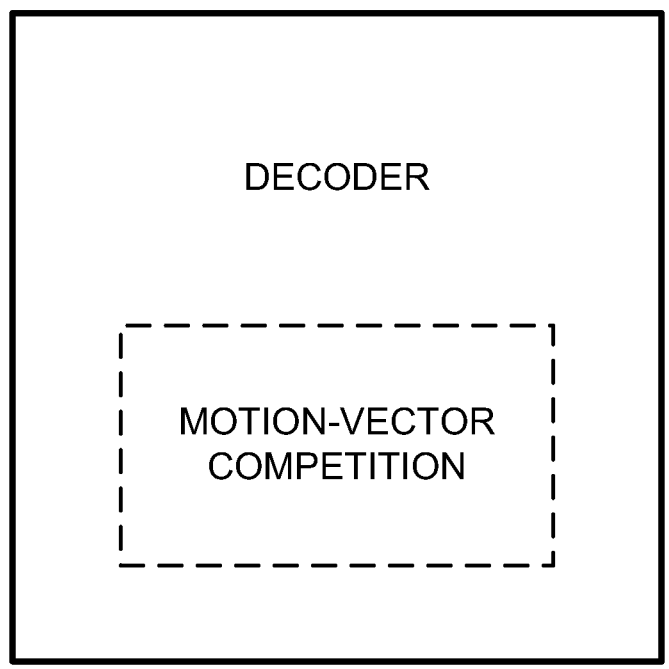
FIG. 6 illustrates a decoder with motion vector competition.

Referring to FIG. 6, a motion vector competition technique may likewise include a decoder that receives a bit stream from which a motion vector competition is applied. This data may include any suitable data previously described. In some embodiments, the motion vector competition technique that includes a buffer compression may be used, without necessarily including the additional features described in relation to FIG. 4 and FIG. 5.

By using a flooring function for the selection of candidate vectors from the previous frame the number of candidate vectors from the previous frame is reduced. In this manner, the system may effectively reduce the number of vectors without likely eliminating the most appropriate motion vector from the available selection. Moreover, by reducing the list of candidate vectors in an effective manner, the memory buffer may be reduced, which reduces the complexity of the system, especially suitable for embedded systems.

In particular to creating the list of motion vectors from blocks in previously transmitted frames 410, typically the motion vector is only added to the list if it is available. Thus, for a current block, one the system only uses the motion vector from a previous frame if the co-located block uses a motion vector. While functional, such an approach does not take into account the full nature of the video stream of encoded frames.

A modified technique for the current block in the current frame that spans the pixel locations (x,y) to (x+N, y+M) is to only to select and to store in the memory buffer a motion vector if the pixel at location ((x>>Z)<<Z, (y>>Z)<<Z) in the previous frame is coded using an inter-coding technique. Z is preferably an integer. In general, this means that the location in a previous frame can not be coded with an intra-prediction technique.

Another modified technique for the current block in the current frame that spans pixels locations (x,y) to (x+N, y+M) is to only to select and to store in the memory buffer a motion vector if the pixel at location ((x>>Z)<<Z+, (y>>Z)<<Z)+Y) in the previous frame is coded using an inter-coding technique. Preferably Y and Z are integers. In general, this means that the location in a previous frame can not be coded with an intra-prediction technique.

Yet another modified technique for the current block in the current frame that spans pixel location (x,y) to (x+N, y+M) is to only to select and to store in the memory buffer a motion vector if the pixel at location ((x+N/2>>Z)<<Z)+Y, (y+M/2>>Z)<<Z)+Y) in the previous frame is coded using an inter-coding technique. Preferably Y and Z are integers. In general, this means that the location in a previous frame can not be coded with an intra-prediction technique.

In a preferred implementation a combination of the flooring function is combined with the limitation of an inter-coding technique. For example, the system may only select a motion vector from a previous frame if the co-located block is coded using an inter-coding technique. Furthermore, preferably if the system points to an intra-coded block in the previous frame, then the motion vector may be assumed to be 0 at that location.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for deriving a motion vector of a current block, in a current frame, the method comprising:
   generating a motion vector predictor candidate list, wherein the motion vector predictor candidate list comprises a set of first motion vectors and a second motion vector;
   wherein a first motion vector, in the set of first motion vectors, belongs to at least one adjacent block, which is adjacent to the current block in the current frame;
   wherein the second motion vector is a temporal motion vector belonging to a pixel at a modified position (x', y') in a previous frame, the modified position (x', y') derived by modifying a top-left position (x, y) of the current block;
   deriving the modified position (x', y') by: (i) setting a first intermediate position as (x+N/2, y+M/2) where N is a horizontal size of the current block and M is a vertical size of the current block, (ii) setting a second intermediate position by performing an arithmetic right shift operation to the first intermediate position, and thereafter (iii) setting the position (x', y') by performing an arithmetic left shift operation to the second intermediate position;
   setting the second motion vector equal to a motion vector at the modified position (x', y') of the pixel in the previous frame; and
   deriving the motion vector of the current block by using a motion vector predictor, which is a motion vector from the motion vector predictor candidate list, and a difference motion vector, which is the difference between the motion vector predictor and an actual motion vector.

2. The method of claim 1, wherein the list is created by adding available motion vectors.

3. The method of claim 1, wherein the motion vectors in the adjacent block includes a motion vector from a block located above a current block, a motion vector from a block located to the left of the current block, a motion vector from a block located above and to the left of the current block, a motion vector from a block located above and to the right of the current block, and a motion vector from a block located below and to the left of the current block.

4. The method of claim 1, wherein motion vectors corresponding to the co-located block are assumed to be 0 if the co-located block is an intra-prediction block in the previous frame.

5. The method of claim 1 wherein the second motion vector is only used if the pixel at a particular location in the previous frame is coded using an inter-prediction technique.

* * * * *